United States Patent [19]

Sawhill, Jr.

[11] 3,860,777

[45] Jan. 14, 1975

[54] PROCESS FOR WELDING LOW-ALLOY STEELS CONTAINING NIOBIUM

[75] Inventor: James M. Sawhill, Jr., Ann Arbor, Mich.

[73] Assignee: American Metal Climax, Inc., New York, N.Y.

[22] Filed: Apr. 3, 1974

[21] Appl. No.: 457,468

[52] U.S. Cl.................... 219/61, 219/145, 219/146
[51] Int. Cl............................................. B23k 31/06
[58] Field of Search............ 75/123 J; 219/145, 146, 219/61

[56] References Cited
UNITED STATES PATENTS

| | | | |
|---|---|---|---|
| 2,909,650 | 10/1959 | Landis et al. | 219/146 |
| 3,476,909 | 11/1969 | Kameda et al. | 219/145 X |
| 3,596,053 | 7/1971 | Kameda et al. | 219/146 |
| 3,620,717 | 11/1971 | Sekino et al. | 75/123 J X |
| 3,661,537 | 5/1972 | Aronson et al. | 75/123 J X |

*Primary Examiner*—J. V. Truhe
*Assistant Examiner*—N. B. Herkamp
*Attorney, Agent, or Firm*—Harness, Dickey & Pierce

[57] ABSTRACT

A process for welding high-strength low-alloy steels containing niobium, producing thereby weld deposits which are of improved strength and toughness in comparison to weld deposits heretofore produced in accordance with prior art techniques. The process comprises introducing controlled amounts of vanadium and/or titanium into the molten weld metal along with other alloying elements in a manner to form an alloyed weld deposit in which the concentration of vanadium and/or titanium is carefully controlled in relationship to the niobium content present. The invention also relates to welded structures produced in accordance with the process aspects of the invention, as well as consumable welding electrode compositions for use in the practice of the method.

25 Claims, 3 Drawing Figures

PATENTED JAN 14 1975                    3,860,777

PROCESS FOR WELDING LOW-ALLOY STEELS CONTAINING NIOBIUM

BACKGROUND OF THE INVENTION

The present invention is particularly applicable but not necessarily restricted to a process for welding high-strength low-alloy steels containing niobium, which are suitable for the fabrication of line-pipe for the transmission of crude petroleum, refined petroleum products, natural gas and the like. Recently developed high-strength molybdenum alloyed steels containing niobium have been found to be particularly suitable for the fabrication of line-pipe because of their excellent yield strength in combination with high toughness at low temperatures. Typical of such low-alloy steels are the so-called pearlite-reduced molybdenum-niobium steels, which nominally contain 0.08% carbon, 1.45% manganese, 0.2% molybdenum and 0.05% niobium, and are characterized as being of a fine-grain polygonal ferrite microstructure having small areas of pearlite and upper bainite contributing toward their excellent yield strength, which generally is greater than about 70,000 psi. Another such low-alloy steel is the so-called pearlite-free manganese-molybdenum-niobium steels nominally containing about 0.05% carbon, 1.8% manganese, 0.3% molybdenum and 0.06% niobium, which are characterized as having a predominantly acicular ferrite matrix and a certain amount of fine-grain polygonal ferrite depending upon the specific conditions employed in the manufacture of the steel plate. Yield strengths ranging from 70,000 psi to over 90,000 psi are typical for such low-carbon manganese-molybdenum-niobium steels, with the particular yield strength being dependent upon the hot-rolling practice and subsequent aging or expansion of the line-pipe forming operations. Low-alloy steels of the foregoing type having an acicular ferrite microstructure are described in greater detail in U.S. Pat. No. 3,726,723 which is assigned to the same assignee as the present invention and the teachings of which are incorporated herein by reference.

In spite of the extremely good mechanical properties of such molybdenum alloyed hot-rolled low-alloy steels containing niobium for use in the fabrication of line-pipe, the presence of niobium in the base steel causes an embrittlement of the weld deposit and somewhat detracts from a more widespread use thereof. The detrimental effects of niobium present in the weld deposit in the foregoing steel, and others containing niobium, usually occurs when the niobium concentration is greater than about 0.01% and results in a significant reduction in the toughness of the weld joint at low temperatures accompanied by an increase of the temperature of the ductile-to-brittle transition under impact loading conditions. This problem is aggravated when high-heat input welding processes are used causing an appreciable melting of the base metal and a high dilution of the final weld deposit with the niobium containing base steel.

The particular mechanism by which niobium effects an embrittlement of the weld deposit forms no part of the present invention, although it has been suggested that the effect is primarily due to a modification in the microstructure of the weld deposit. One mechanism suggested is that niobium causes precipitation hardening and the resulting hardness increase is accompanied by a decrease in toughness. Another proposed mechanism is that the presence of niobium effects a coarsening of the bainitic structure which is of an inferior toughness to that of a fine bainitic structure devoid of niobium.

Regardless of the specific mechanism involved, the present invention provides a process which overcomes the detrimental niobium embrittlement effects associated with prior art practices in welding low-alloy steels containing niobium, whereby weld joints and welded structures can now be economically fabricated which are possessed of superior mechanical characteristics.

SUMMARY OF THE INVENTION

The benefits and advantages of the present invention, in accordance with its process aspects, are achieved by a method in which low-alloy steels generally containing greater than about 0.02% niobium are welded to produce weld deposits which are characterized as being of improved strength and toughness in comparison to weld deposits heretofore obtained employing prior art practices. The process involves the introduction of controlled quantities of titanium or vanadium, as well as combinations thereof, into the molten weld metal in carefully controlled amounts relative to the concentration of niobium present, whereby the detrimental embrittlement effects of niobium are overcome. The particular manner in which the titanium and/or vanadium additive elements are introduced into the weld metal can be varied consistent with the particular type of welding technique employed in order to provide optimum ease and economy of fabrication.

Conventionally, the two additive elements are incorporated together with other alloying elements in a consumable welding wire or electrode which forms a part of and becomes completely alloyed with a portion of the base metal forming the final solidified weld deposit. The concentration of the vanadium and/or titanium additive metals in the filler metal is controlled in consideration of the degree of dilution of the filler metal by base metal and the actual recovery of the additive metals as a metallic alloying constituent in the final weld deposit.

The concentration of vanadium may broadly range from a value of about 1.2 up to about five times the percentage of niobium present in the weld metal deposit, while the titanium concentration is controlled so as to broadly range from about 0.2 up to about 0.8 of the percentage of niobium present. When a combination of the two additive metals is employed, their relative quantities in relationship to the concentration of niobium present is expressed by the following composition equation:

$$2.5 \times \%Ti + 0.4 \times \%V = (0.5 \text{ to } 2.0) \times \%Nb$$

In its structural aspects, the present invention is directed to welded structures comprising molybdenum alloyed steel containing niobium incorporating welded joints defined by weld deposits nominally containing about 0.01% to about 0.12% or greater niobium, 0.5% up to 3.0% manganese; 0.1% to about 1.5% molybdenum, 0.02% to about 0.15% carbon, up to about 3.0% nickel, up to 0.4% copper, up to 0.4% silicon, up to 0.4% chromium, up to 0.03% phosphorus, up to 0.03% sulfur, titanium and/or vanadium in a concentration relative to the quantity of niobium present in accordance with the foregoing composition equation; and the balance substantially all iron, together with conventional residuals and incidental impurities present in usual amounts. The invention further concerns consumable electrode or wire compositions of a controlled composition which are particularly adaptable for use in single or multiple electrode submerged-arc welding processes in which base metal dilution of the weld deposit generally ranges from about 60% to about 70%.

Still further benefits and advantages of the present invention will become apparent upon a reading of the description of the preferred embodiments taken in conjunction with the accompanying drawing.

DESCRIPTION OF THE PREFERRED EMBODIMENTS

Figure 1:
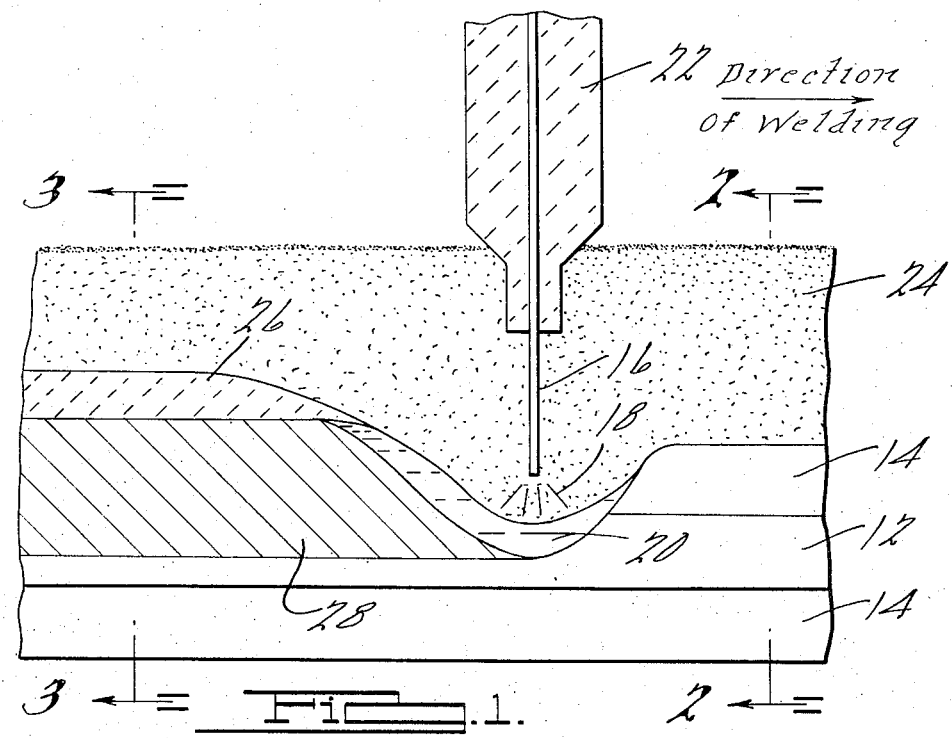
FIG. 1 is a fragmentary longitudinal vertical sectional view of a submerged-arc welding process as applied to a base metal in accordance with the practice of the present invention and as taken along the line 1—1 of FIG. 2.

The several compositions of the base plate, the electrode or filler metal, the molten weld metal and the final solidified weld deposit are herein defined in terms of percentages by weight of the individual constituents, unless clearly indicated to the contrary.

Referring now in detail to the drawing, a single electrode double-pass submerged-arc welding arrangement is illustrated which has been found to be suitable for welding high-strength low-alloy base metals containing niobium in accordance with the practice of the present process. It will be appreciated, however, that any welding technique in which an appreciable quantity of base metal becomes molten, also can be employed to advantage in accordance with this invention. Typical of such alternative satisfactory welding techniques are gas metal-arc welding either automatic or semi-automatic, shielded metal-arc welding processes, flux-cored welding, or the like. The two-pass submerged-arc welding technique is particularly satisfactory for producing longitudinal or spiral welded joints in the fabrication of transmission pipelines.

As shown in the drawings, the abutting edges of base plates 10, 12 are beveled, as indicated at 14, forming a longitudinally extending V-shaped groove. The end of a consumable welding wire or electrode 16 extends to a position spaced from the surfaces of the beveled base plates and an electric arc, indicated at 18 in FIG. 1, passes between the base metal and electrode, effecting a simultaneous melting of the base metal and electrode filler metal to form a molten weld metal indicated at 20 in FIG. 1. The welding electrode 16 is supported by a torch 22, which supports the electrode during its travel in a direction toward the right as indicated by the arrow in FIG. 1. It is also contemplated that a plurality of torch and welding electrode assemblies can be employed in longitudinally spaced relationship utilizing either direct or alternating current to generate arcs in order to provide a welded structure of the desired characteristics and rate of fabrication.

Figures 2, 3:
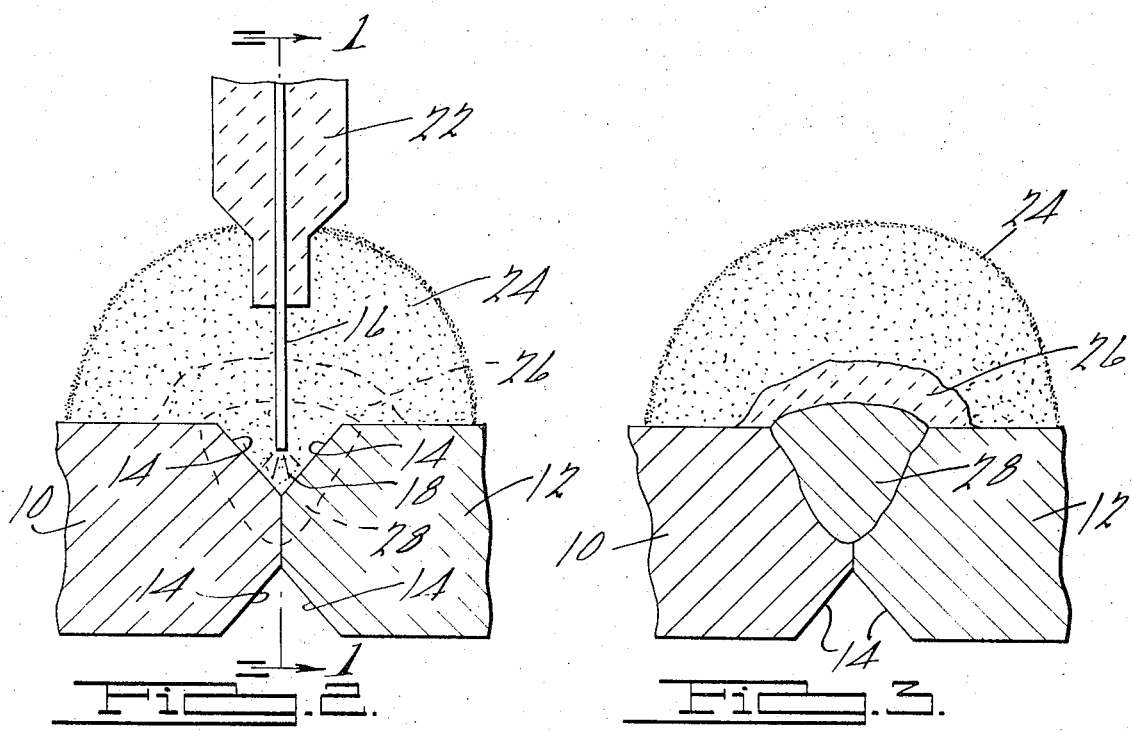
FIG. 2 is a fragmentary transverse vertical sectional view through the base plate being welded as shown in FIG. 1 and taken substantially along the line 2—2 thereof.
FIG. 3 is a fragmentary transverse sectional view of the welded base plate and weld deposit shown in FIG. 1 and taken substantially along the line 3—3 thereof.

In the exemplary embodiments shown in the drawing, the lower end of the electrode, as well as the region of the weld joint, is covered by a particulated flux, indicated at 24, in which the arc and molten weld metal are submerged so as to avoid oxidation of the metallic constituents at the elevated temperatures encountered during the welding operation. Some of the flux becomes fused at the high temperatures encountered forming a slag layer, indicated at 26 in FIGS. 1 and 3, which protects the molten weld metal unitl it solidifies into a weld deposit or bead indicated at 28. The slag layer subsequently is removed from the surface of the welded joint. At the completion of welding one side of the base plates 10 and 12, a second pass is made with an electrode along the opposite beveled edge to form a second weld deposit (not shown) substantially similar to the weld deposit 28.

It will be apparent from the drawing that the weld deposit or bead comprises an alloy consisting of the constituents present in the molten base plate and the constituents contained in the consumable electrode or filler metal. The turbulence imparted to the molten weld metal 20 by the electric arc results in a final weld deposit which is of a substantially uniform alloy composition throughout. Typically, submerged-arc welding practices in accordance with the arrangement illustrated in the drawing cause the weld deposit to comprise from about 60% to about 70% of the base metal, usually 65% of the base metal, with the balance comprising the filler metal.

The base metal may comprise any high-strength low-alloy steel containing niobium in a concentration such that during welding thereof, the base metal dilutes the filler metal employed to an extent that the final weld deposit contains at least about 0.01% niobium. The concentration of niobium in the weld deposit contributed as a result of base metal dilution may range as high as 0.12% and even higher, depending upon the particular low-alloy steel and the welding technique employed. In any event, concentrations of niobium greater than about 0.01% in the weld deposit have been observed to cause detrimental embrittlement and loss of toughness of the welded structure which is overcome by the addition of controlled amounts of titanium and/or vanadium as a function of the niobium present. While significant improvements are obtained when welding steels containing as little as 0.02% niobium, the benefits of the present invention are more fully realized when welding base steels containing upwards of about 0.05% niobium. High-strength low-alloys steels containing upwards of about 0.05% niobium are particularly suitable for the fabrication of line-pipe and the structural aspects of the present invention are directed toward welded line-pipe comprised of such steels manufactured in accordance with the process aspects of this invention whereby superior mechanical properties are provided.

In accordance with the practice of the present invention, the niobium containing high-strength low-alloy steel in combination with the filler metal is welded so as to produce a weld deposit composition containing the specific costituents as set forth in Table 1.

TABLE 1

Weld Deposit Composition

| Ingredient | Percent by Weight | |
|---|---|---|
| | Useable Range | Preferred Range |
| Niobium | 0.01 – 0.12 | 0.01 – 0.08 |
| Manganese | 0.5 – 3.0 | 1.2 – 2.2 |
| Molybdenum | 0.1 – 1.5 | 0.3 – 0.6 |
| Carbon | 0.02 – 0.15 | 0.05 – 0.1 |
| Titanium/Vanadium | (a) | (b) |
| Nickel | up to 3.0 | 0.75 – 1.75 |
| Copper | up to 0.6 | up to 0.4 |
| Silicon | up to 0.6 | up to 0.4 |
| Chromium | up to 1.0 | up to 0.4 |
| Phosphorus | up to 0.03 | less than 0.01 |
| Sulfur | up to 0.03 | less than 0.01 |
| Iron | balance | balance |

(a) $2.5 \times \%Ti + 0.4 \times \%V = (0.5 \text{ to } 2.0) \times \%Nb$
(b) $2.5 \times \%Ti + 0.4 \times \%V = (0.75 \text{ to } 1.5) \times \%Nb$ In addition to niobium derived from the base metal, the weld deposit further contains controlled additions of manganese, molybdenum, carbon, in addition to the titanium and/or vanadium additive metals with the balance consisting essentially of iron and minimal quantities of copper, silicon, chromium, phosphorus and sulfur together with usual residuals and incidental impurities present in the normal amounts. The concentration of the titanium and vanadium in accordance with the permissible and preferred practice is expressed in Table 1 by composition equations a and b, respectively.

The manganese constituent is useful for preventing weld metal hot cracking. Quantities less than about 0.5% cause the weld metal to experience hot cracking in the presence of certain levels of impurities, whereas quantities in excess of about 3.0% cause the weld metal to be excessively hard and to lose toughness. Preferably, manganese is controlled within a range of about 1.2% to about 2.2%.

The molybdenum constituent contributes strength and toughness to the weld deposit. Amounts less than about 0.1% cause the weld metal to lose strength and toughness, while amounts in excess of about 1.5% cause a high hardness and loss in the toughness of the weld deposit. In accordance with the preferred practice, the molybdenum constituent is controlled within a range of about 0.3% to about 0.6%.

The nickel constituent contributes strength and toughness to the weld deposit, and is controlled so as to range up to about 3%, and preferably is maintained within a range of about 0.75% to about 1.75%. Amounts of nickel greater than about 3% are unnecessary for the attainment of good toughness and may increase the susceptibility of the weld deposit to hot cracking.

The carbon content of the weld deposit may broadly range from about 0.02% to as high as about 0.15%, and preferably is controlled within a range of about 0.05% to about 0.1%. A control of the carbon content in the weld deposit within the foregoing ranges provides adequate hardenability of the weld deposit without loss of toughness.

The copper, silicon and chromium constituents are present as normal residuals and do not constitute essential alloying constituents of the weld deposit. The phosphorus and sulfur constituents comprise incidental impurities and can be tolerated up to the maximum limits specified and preferably are maintained as low as possible in consideration of accepted commercial steel making practices.

The titanium and/or vanadium additive constituents are present in the weld deposit in consideration of the quantity of niobium present. The interrelationship of the relative effectiveness of the titanium and vanadium constituents relative to the quantity of niobium present is represented by the composition equation a above; while a preferred relationship of these two metals relative to the niobium constituent is represented by the composition equation b. A particularly satisfactory combination of elements is represented by composition equation c as follows:

(c) $\quad 2.5 \times \%Ti + 0.4 \times \%V = \%Nb$

Composition equation c represents a relationship in which the ratio of the sum of the products derived by multiplying the precentage of titanium by 2.5 and the percentage of vanadium by 0.4 relative to the percentage of niobium is unity.

When only titanium is employed to offset the adverse embrittlement effect of the niobium constituent, the relationship between these two alloying elements is broadly set forth in composition equation d; a preferred form is represented by composition equation e; while a particularly satisfactory embodiment is represented by composition equation f:

(d) $\quad Ti = (0.2 \text{ to } 0.8) \times \%Nb$
(e) $\quad Ti = (0.3 \text{ to } 0.6) \times \%Nb$
(f) $\quad Ti = 0.4 \times \%Nb$ When vanadium is employed in the absence of titanium, the broad permissible relationship between the concentration of vanadium in the weld deposit relative to the niobium concentration is represented by composition equation g; the preferred relationship between vanadium and niobium is represented in composition equation h; while a particularly satisfactory embodiment is represented by the composition equation i.

(g) $\quad V = (1.2 \text{ to } 5.0) \times \%Nb$
(h) $\quad V = (1.9 \text{ to } 3.75) \times \%Nb$
(i) $\quad V = 2.5 \times \%Nb$ In addition to the specific alloying agents as enumerated in Table 1, the weld deposit may also contain minimal quantities of other alloying constituents derived either from the base metal or from the filler metal which are of a type and are present in quantities which do not adversely detract from the high yield strength and toughness of the weld deposit, particularly at low temperatures.

The manner in which the titanium and/or vanadium additive metals are introduced into the weld deposit is not important and can be varied depending upon the particular welding technique employed and the nature of the structure being welded. For example, the titanium and/or vanadium additive metals can be positioned in the beveled groove defining the joint to be welded, such as in the form of a wire or powder either in substantially pure or prealloyed form. The additive metals may also be admixed with the flux, such as in the case of a submerged-arc welding technique as illustrated in the drawing. Preferably, the additive metals together with other alloying constituents are combined in a welding wire or electrode which is consumed during the welding process, which usually provides for better control of the composition of the resultant weld deposit.

Regardless of the specific manner by which the additive metals are introduced into the weld deposit, an allowance must be made for that proportion which is lost through oxidation during the welding operation in spite of the use of protective fluxes and non oxidizing atmospheres. The actual recovery of the two additive metals will vary depending upon the specific welding technique employed, with the recovery of titanium generally being substantially less than that of vanadium due to its higher reactivity and affinity for oxygen. As a general rule, the actual recovery of titanium is about 20%, while that of vanadium is about 95% when using the submerged-arc welding process. Accordingly, only about 20% of the titanium, while as much as 95% of the vanadium present in the filler metal, is actually introduced into the weld deposit metal in the form of a metallic alloying constituent.

A typical filler metal composition, such as in the form of a consumable welding wire or electrode, is set forth in Table 2. The composition of the filler metal is specifically tailored for use in the submerged-arc welding of a manganese-molybdenum-niobium high-strength low-alloy steel of the specific types defined in the aforementioned U.S. Pat. No. 3,726,723 and by which technique the resultant weld deposit comprises approximately 65% of the base metal and 35% of the filler metal.

TABLE 2

Filler Metal Composition

| Ingredient | Percent by Weight |
|---|---|
| Manganese | 1.0 – 3.5 |
| Molybdenum | 0.2 – 2.0 |
| Carbon | 0.02 – 0.15 |
| Titanium/Vanadium | * |
| Nickel | up to 5 |
| Copper | up to 0.4 |
| Silicon | up to 0.4 |
| Chromium | up to 0.4 |
| Phosphorus | less than 0.01 |
| Sulfur | less than 0.01 |
| Iron | balance |

*Composition equations (a) – (i) with allowance for loss and dilution during welding.

The additive titanium and/or vanadium metals are incorporated in the filler metal in amounts established by the quantity of niobium present in the base metal, which will become alloyed with the weld deposit with allowance for a recovery of 20% of the titanium and a recovery of 95% of the vanadium in the filler metal employing the submerged-arc welding process. Appropriate adjustments are made to the filler metal composition in consideration of alternative welding processes which occasion a variation in the percentage dilution of the weld deposit by the base metal; the percentage recovery of the vanadium and/or titanium additive metals; the concentration of niobium in the base metal; and the presence of other alloying constituents in the base metal in consideration of the preferred weld deposit composition as set forth in Table 1.

A typical high-strength low-alloy manganese-molybdenum-niobium steel contains 0.07% niobium and in line-pipe construction, is welded with a two-pass submerged-arc technique as shown in the figure. In this process, the weld deposit comprises from about 60% to about 70% of the base metal with the balance comprising the filler metal, as a result, about 0.045% niobium is present in the weld deposit. Allowing for a recovery of 95% of the vanadium, the filler metal should contain from 0.15% to 0.64% vanadium to produce the relative amounts of vanadium and niobium in the weld deposit as given by equation $g$. The filler metal should preferably contain from 0.23% to 0.46% vanadium to produce the relative amounts of vanadium and niobium in the weld deposit as given by equation $h$ and a particularly satisfactory amount of vanadium in the filler metal is 0.31%. If titanium is used instead of vanadium, calculations based on equations $d$, $e$ and $f$ assuming a recovery of 20% of the titanium in the weld deposit indicate that the filler metal should contain from 0.13% to 0.51% titanium, preferably from 0.19% to 0.39% titanium, while a particularly satisfactory amount of titanium in the filler metal is 0.26%.

The above vanadium or titanium concentrations in the filler metal may be used to deposit weld metals having high toughness in a two-pass submerged-arc weld with 0.07% niobium in the base metal. combinations of the two elements may also be used by employing equations $a$, $b$ and $c$ to calculate the vanadium and titanium contents required in the filler metal as shown before for the single additions of vanadium and titanium.

In order to further describe the present invention, the following example is provided. It will be understood that the exemplary embodiments as hereinafter set forth are provided solely for illustrative purposes and are not intended to be limiting of the scope of the present invention from that as herein described and as set forth in the subjoined claims.

EXAMPLE

Commercially-produced manganese-molybdenum-niobium steel plates of 11/16-inch thickness are sectioned and beveled to provide a joint similar to that as shown in the drawing and a V-notch of 70° extending inwardly of each surface of the base plate approximately 7/32-inch leaving an inner unbeveled section of one-fourth inch. A welding wire or electrode having a nominal diameter of one-eighth inch is used for effecting a weld pass by the submerged-arc technique on each side of each joint. A basic neutral flux is used. The electrode and base metal compositions are shown in Table 3.

TABLE 3

Base Metal and Electrode Composition

| Ingredient | Percent by Weight | |
|---|---|---|
| | Base Metal | Electrode |
| C | 0.05 | 0.15 |
| Mn | 2.09 | 2.0 |
| Si | 0.07 | 0.09 |
| S | | 0.010 |
| P | 0.005 | 0.006 |
| Ni | 0.13 | 2.6 |
| Mo | 0.29 | 0.56 |
| V | — | 0.005 |
| Ti | — | 0.005 |
| Zr | — | 0.025 |
| Cr | 0.05 | 0.10 |
| Al | 0.06 | — |
| Nb | 0.07 | — |

The welding parameters range from 475 to 600 amperes, 37 to 40 volts and a speed of travel of 20 inches per minute, providing for a heat input ranging from 53 up to 72kJ/inch.

Controlled variations in the amount of titanium and vanadium introduced into the weld metal is accomplished by laying small-diameter wires of the pure elements in the joint. The titanium and vanadium become completely mixed in the weld puddle by the violent stirring action of the arc. Different titanium and vanadium contents are obtained in several weld deposits as shown in Table 4. The weld deposits were analyzed for niobium and were found to contain 0.046% Nb. Standard Charpy V-notch test specimens were sectioned and notched in the center of the fusion zone. The results of Charpy impact tests are also summarized in Table 4.

TABLE 4

| Test Weld No. | Weld Deposit Analysis, Weight % | | Transition Temperature, °F | |
|---|---|---|---|---|
| | Ti | V | 50 ft-lb | 50% Shear Fracture Appearance |
| 1 (Control) | 0.005 | 0.01 | −14 | −17 |
| 2 | 0.013 | 0.01 | −63 | −54 |
| 3 | 0.017 | 0.01 | −73 | −66 |
| 4 | 0.020 | 0.01 | −71 | −56 |
| 5 | 0.005 | 0.05 | −21 | −30 |
| 6 | 0.005 | 0.10 | −46 | −48 |
| 7 | 0.008 | 0.05 | −69 | −69 |

A comparison of the results as set forth in Table 4 obtained on Test Welds 2 through 7 with Test Weld 1 in which no addition of vanadium or titanium was made to the weld deposit other than that contained in the electrode as set forth in Table 3, clearly show the higher level of toughness and shear (ductile) fracture of the niobium containing weld deposits with vanadium and/or titanium additions as compared to the same niobium-containing weld deposit devoid of vanadium and/or titanium additions.

Photomicrographs taken of weld deposits made in accordance with the practice of the present invention indicate that the introduction of controlled amounts of titanium or vanadium or combinations thereof promotes the formation of a finer bainitic structure in comparison to the relatively coarse bainitic structure of weld deposits which do not contain the additive titanium and/or vanadium metals within the specific range of concentrations as hereinabove set forth.

While it will be apparent that the invention herein disclosed is well calculated to achieve the benefits and advantages set forth above, it will be appreciated that the invention is susceptible to modification, variation and change without departing from the spirit thereof.

What is claimed is:

1. The process for welding a low-alloy steel base plate metal containing greater than about 0.02% niobium to produce a welded connection of improved strength and toughness which comprises the steps of heating the base metal in the area defining the joint to be welded to cause at least a partial melting thereof and the formation of a liquid weld metal, introducing into said liquid weld metal in a manner to effect an alloying thereof an additive metal selected from the group consisting of titanium, vanadium and mixtures thereof, said additive metal present in an amount to provide a residual concentration in the resultant solidified weld deposit produced in proportion to the amount of niobium present in said weld deposit in accordance with the following relationship:

$$2.5 \times \%Ti + 0.4 \times \%V = (0.5 \text{ to } 2.0) \times \%Nb.$$

2. The process as defined in claim 1, in which said additive metal is present in the solidified weld deposit in accordance with the following relationship:

$$2.5 \times \%Ti + 0.4 \times \%V = (0.75 \text{ to } 1.5) \times \%Nb.$$

3. The process as defined in claim 1, in which said additive metal is present in the solidified weld deposit in accordance with the following relationship:

$$2.5 \times \%Ti + 0.4 \times \%V = \%Nb.$$

4. The process as defined in claim 1, in which said additive metal is titanium and is present in the solidified weld deposit in accordance with the following relationship:

$$Ti = (0.2 \text{ to } 0.8) \times \%Nb.$$

5. The process as defined in claim 1, in which said additive metal is titanium and is present in the solidified weld deposit in accordance with the following relationship:

$$Ti = (0.3 \text{ to } 0.6) \times \%Nb.$$

6. The process as defined in claim 1, in which said additive metal is titanium and is present in the solidified weld deposit in accordance with the following relationship:

$$Ti = 0.4 \times \%Nb.$$

7. The process as defined in claim 1, in which said additive metal is vanadium and is present in the solidified weld deposit in accordance with the following relationship:

$$V = (1.2 \text{ to } 5.0) \times \%Nb.$$

8. The process as defined in claim 1, in which said additive metal is vanadium and is present in the solidified weld deposit in accordance with the following relationship:

$$V = (1.9 \text{ to } 3.75) \times \%Nb.$$

9. The process as defined in claim 1, in which said additive metal is vanadium and is present in the solidified weld deposit in accordance with the following relationship:

$$V = 2.5 \times \%Nb.$$

10. The process as defined in claim 1, in which said solidified weld deposit contains about 0.5% to about 3.0% manganese, about 0.1% to about 1.5% molybdenum, about 0.02% to about 0.15% carbon, up to about 3% nickel, up to about 0.6% copper, up to about 0.6% silicon, up to about 1.0% chromium, up to about 0.03% phosphorus, up to about 0.03% sulfur, about 0.01% up to about 0.12% niobium and said additive metal present in accordance with said relationship, and the balance consisting essentially of iron together with usual residuals and incidental impurities present in the normal amounts.

11. The process as defined in claim 1, in which said solidified weld deposit contains about 1.2% to about 2.2% manganese, about 0.3% to about 0.6% molybdenum, about 0.05% to about 0.1% carbon, about 0.75% to about 1.75% nickel, up to 0.4% copper, up to 0.4% silicon, up to 0.4% chromium, less than 0.01% phosphorus, less than 0.01% sulfur, about 0.01% to about 0.08% niobium together with said additive metal present in accordance with said relationship, and the balance consisting essentially of iron together with usual residuals and incidental impurities present in conventional amounts.

12. The process as defined in claim 1, in which the introduction of said additive metal into said liquid weld metal is achieved by employing a weld filler metal.

13. The process as defined in claim 1, wherein the introduction of said additive metal into said liquid weld metal is accomplished by positioning said additive metal in elemental form in the area defining the joint to be welded to cause a concurrent melting thereof and the base metal.

14. The process as defined in claim 1, in which the introduction of said base metal into said liquid weld metal is accomplished by employing a consumable welding electrode containing appropriate quantities of said additive metal.

15. The process for fabricating line-pipe by welding a low-alloy steel base plate metal containing greater than about 0.02% niobium which comprises the step of heating the base plate metal in the area defining the joint to be welded to cause at least a partial melting thereof and the formation of a liquid weld metal, introducing into said liquid weld metal in a manner to effect an alloying thereof an additive metal selected from the group consisting of titanium, vanadium and mixtures thereof, said additive metal present in an amount to provide a residual concentration in the resultant solidified weld deposit produced in proportion to the amount of niobium present in said weld deposit in accordance with the following relationship:

$$2.5 \times \%Ti + 0.4 \times \%V = (0.5 \text{ to } 2.0) \times \%Nb,$$

said weld deposit containing greater than about 0.01% niobium.

16. The process as defined in claim 15, in which said base plate metal contains greater than about 0.05% niobium and said additive metal is present in the said solidified weld deposit in accordance with the following said relationship:

$$2.5 \times \%Ti + 0.4 \times \%V = (0.75 \text{ to } 1.5) \times \%Nb.$$

17. The process as defined in claim 15, in which the step of heating the base plate metal and the step of introducing into said liquid weld metal said additive metal is achieved by a submerged-arc welding process employing a consumable electrode incorporating said additive metal in specified amounts.

18. A welded line-pipe comprising a high-strength low-alloy steel base plate metal containing greater than about 0.02% niobium joined at the abutting edges thereof by a weld deposit, said weld deposit containing about 0.01% to about 0.12% niobium, about 0.5% to about 3% manganese, about 0.1% to about 1.5% molybdenum, about 0.02% to about 0.15% carbon, up to 3.0% nickel, up to 0.6% copper, up to 0.6% silicon, up to 1.0% chromium, up to 0.03% phosphorus, up to 0.03% sulfur, an additive metal selected from the group consisting of titanium, vanadium and mixtures thereof present in proportion to the amount of niobium present in accordance with the following relationship:

$$2.5 \times \%Ti + 0.4 \times \%V = (0.5 \text{ to } 2.0) \times \%Nb$$

and the balance consisting essentially of iron along with usual residuals and incidental impurities present in conventional amounts.

19. The line-pipe as defined in claim 18, in which said base plate metal contains greater than about 0.05% niobium.

20. The line-pipe as defined in claim 18, in which the composition of said weld deposit is 0.01% to 0.08% niobium, 1.2% to 2.2% manganese, 0.3% to 0.6% molybdenum, 0.05% to 0.1% carbon, 0.75% to 1.75% nickel, up to 0.4% copper, up to 0.4% silicon, up to 0.4% chromium, less than about 0.01% phosphorus, less than about 0.01% sulfur, and wherein said additive metal is present in said weld deposit in proportion to the niobium content thereof in accordance with the following said relationship:

$$2.5 \times \%Ti + 0.4 \times \%V = (0.75 \text{ to } 1.5) \times \%Nb.$$

21. The line-pipe as defined in claim 20, in which said base plate steel contains greater than about 0.05% niobium.

22. The line-pipe as defined in claim 18, in which said additive metal is titanium.

23. The line-pipe as defined in claim 18, in which said base plate steel contains greater than about 0.05% niobium and said additive metal consists of titanium.

24. The line-pipe as defined in claim 18, in which said additive metal is vanadium.

25. The line-pipe as defined in claim 18, in which the niobium content of said base plate steel is greater than about 0.05% and said additive metal consists of vanadium.

* * * * *

UNITED STATES PATENT OFFICE
CERTIFICATE OF CORRECTION

PATENT NO. : 3,860,777
DATED : January 14, 1975
INVENTOR(S) : James M. Sawhill, Jr.

It is certified that error appears in the above-identified patent and that said Letters Patent are hereby corrected as shown below:

Column 11, Claim 14, line 2, "base" should read --additive--. Column 12, Claim 18, line 1, "line-pipe" should read --structure--; and in each of the following: Claim 19, line 1; Claim 20, line 1; Claim 21, line 1; Claim 22, line 1; Claim 23, line 1; Claim 24, line 1 and Claim 25, line 1, "line-pipe" should read --welded structure--.

Signed and Sealed this sixth Day of January 1976

[SEAL]

Attest:

RUTH C. MASON
Attesting Officer

C. MARSHALL DANN
Commissioner of Patents and Trademarks